US007308266B2

(12) United States Patent
Du et al.

(10) Patent No.: US 7,308,266 B2
(45) Date of Patent: *Dec. 11, 2007

(54) METHOD AND SYSTEM FOR PEER-TO-PEER COMMUNICATION MANAGEMENT IN WIRELESS COMMUNICATION NETWORKS

(75) Inventors: Yonggang Du, Shanghai (CN); Li Sun, Shanghai (CN); Ni Ma, Shanghai (CN)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/551,312

(22) PCT Filed: Mar. 10, 2004

(86) PCT No.: PCT/IB2004/050224

§ 371 (c)(1),
(2), (4) Date: Sep. 28, 2005

(87) PCT Pub. No.: WO2004/088874

PCT Pub. Date: Oct. 14, 2004

(65) Prior Publication Data
US 2006/0178148 A1   Aug. 10, 2006

(30) Foreign Application Priority Data
Apr. 1, 2003  (CN) .............................. 03 1 09021

(51) Int. Cl.
*H04Q 7/20* (2006.01)
(52) U.S. Cl. .................. 455/445; 455/518; 455/522; 455/502; 455/511; 455/515; 455/528; 455/415; 455/516; 455/414.1; 455/428; 455/455; 370/278; 370/280; 370/311; 370/330; 370/336; 370/338; 370/342

(58) Field of Classification Search ................ 455/445, 455/518, 522, 415, 416, 414.1, 428, 436, 455/455, 502, 509, 511, 514, 515, 516, 519, 455/528, 11.1; 370/278, 280, 311, 328, 330, 370/336, 338, 342
See application file for complete search history.

(56) References Cited

U.S. PATENT DOCUMENTS 5,423,055 A * 6/1995 Diaz et al. .................... 455/15

(Continued)

FOREIGN PATENT DOCUMENTS

CN          03119892      3/2003

(Continued)

*Primary Examiner*—Matthew Anderson
*Assistant Examiner*—Shaima Q. Aminzay

(57) ABSTRACT

The present invention provides a wireless communication system capable of managing peer-to-peer (P2P) communications. In one embodiment of the invention, upon receiving a request for initiating a call, the system determines whether P2P communication can be established between the two mobile terminals. The system also determines an operating mode of the two mobile terminals for P2P communication. If the P2P communication can be established between the two mobile terminals and both mobile terminals are in a default mode for P2P communication, the system establishes P2P communication between the two mobile terminals. On the other hand, if any one of the mobile terminals is in a prompt mode, the system sends a prompt to the mobile terminal in the prompt mode, along with information about incentives for using P2P communication services. If the user of the mobile terminal in the prompt mode selects the P2P communication services, the system allocates resources for setting up a P2P link between the two mobile terminals. After the P2P communication is completed, the system sends discounted billing information to the mobile terminals.

20 Claims, 2 Drawing Sheets

U.S. PATENT DOCUMENTS

| | | | |
|---|---|---|---|
| 5,636,243 A * | 6/1997 | Tanaka | 375/219 |
| 5,995,844 A * | 11/1999 | Fukuda | 455/462 |
| 6,047,178 A * | 4/2000 | Frlan | 455/423 |
| 6,415,146 B1 * | 7/2002 | Capece | 455/517 |
| 6,459,690 B1 * | 10/2002 | Le Strat et al. | 370/332 |
| 6,580,704 B1 * | 6/2003 | Wellig et al. | 370/338 |
| 6,807,165 B2 * | 10/2004 | Belcea | 370/347 |
| 7,079,509 B2 * | 7/2006 | Belcea | 370/330 |
| 7,082,108 B2 * | 7/2006 | Hwang et al. | 370/311 |
| 2002/0085520 A1 * | 7/2002 | Sydon et al. | 370/335 |
| 2003/0092452 A1 * | 5/2003 | Youngs et al. | 455/461 |
| 2006/0258382 A1 * | 11/2006 | Zhang et al. | 455/501 |

FOREIGN PATENT DOCUMENTS

| | | |
|---|---|---|
| GB | 2336070 | 10/1999 |
| WO | WO0115387 | 3/2001 |

* cited by examiner

METHOD AND SYSTEM FOR PEER-TO-PEER COMMUNICATION MANAGEMENT IN WIRELESS COMMUNICATION NETWORKS

BACKGROUND OF THE INVENTION

The invention relates generally to wireless communication systems, and more particularly to method and system for peer-to-peer (P2P) communication management in wireless communication networks.

P2P communication between two mobile terminals provides a direct link between the two mobile terminals in public land mobile network. P2P communication is particularly appropriate when two users are camping on one cell and close to each other. When the direct link is established, the dedicated links between the base station and mobile terminals can be disconnected, while the common control channel (CCCH) is maintained. This saves two radio channels for the system and reduces the end-to-end delay. In addition, the P2P communication allows for an increase in the system communication capacity because of less transmission power by the mobile terminals within a limited P2P supported radio range. Furthermore, the battery power consumption in the mobile terminals in P2P communication is also saved. Therefore, P2P communication should be highly encouraged as a value-added service.

Among existing 3G systems, the TDD CDMA system is the most suitable system for the application of peer-to-peer communication, because the same carrier frequency is used in both uplink and downlink communications, which will simplify the RF module of the mobile terminal. Additionally, the application of peer-to-peer communication technology will overcome some inherent shortcomings of the TDD CDMA system, such as the shortage of spreading code, small coverage, etc. An example of the TDD CDMA system is the TD-SCDMA system, which has gained more popularity in China.

Rapid deployment of P2P communication services, however, has not yet occurred. One of the main reasons is the lack of an effective scheme for managing the P2P communication services in wireless communication networks.

Therefore, there is a need for an effective scheme for managing the P2P communication services for promoting P2P communications.

SUMMARY OF THE INVENTION

The present invention provides an effective scheme for managing P2P communications between mobile terminals.

According to one embodiment of the invention, a wireless communication system capable of managing peer-to-peer (P2P) communications is provided. In this embodiment, upon receiving a request from a mobile terminal for initiating a call to another mobile terminal, the system determines whether P2P communication can be established between the two mobile terminals. This may be accomplished by determining whether both mobile terminals have subscribed P2P communication services, and if they have, whether both mobile terminals are suitable for using the P2P communication services. The system also determines an operating mode of the two mobile terminals for P2P communication. If the P2P communication can be established between the two mobile terminals and both mobile terminals are in a default mode for P2P communication, the system establishes P2P communication between the two mobile terminals.

On the other hand, in the above embodiment of the invention, if one of the mobile terminals is in a prompt mode, the system sends a prompt to the mobile terminal in the prompt mode, along with information about incentives for using P2P communication services. If the user of the mobile terminal in the prompt mode selects the P2P communication services, the system allocates resources for setting up a P2P link between the two mobile terminals. After the P2P communication between the two mobile terminals is completed, the system records information relating to P2P communication services in at least one of a home location register and a visitor location register, and sends discounted billing information to the mobile terminals.

Other objects and attainments together with a fuller understanding of the invention will become apparent and appreciated by referring to the following description and claims taken in conjunction with the accompanying drawings.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE PREFERRED EMBODIMENTS

Figure 1:
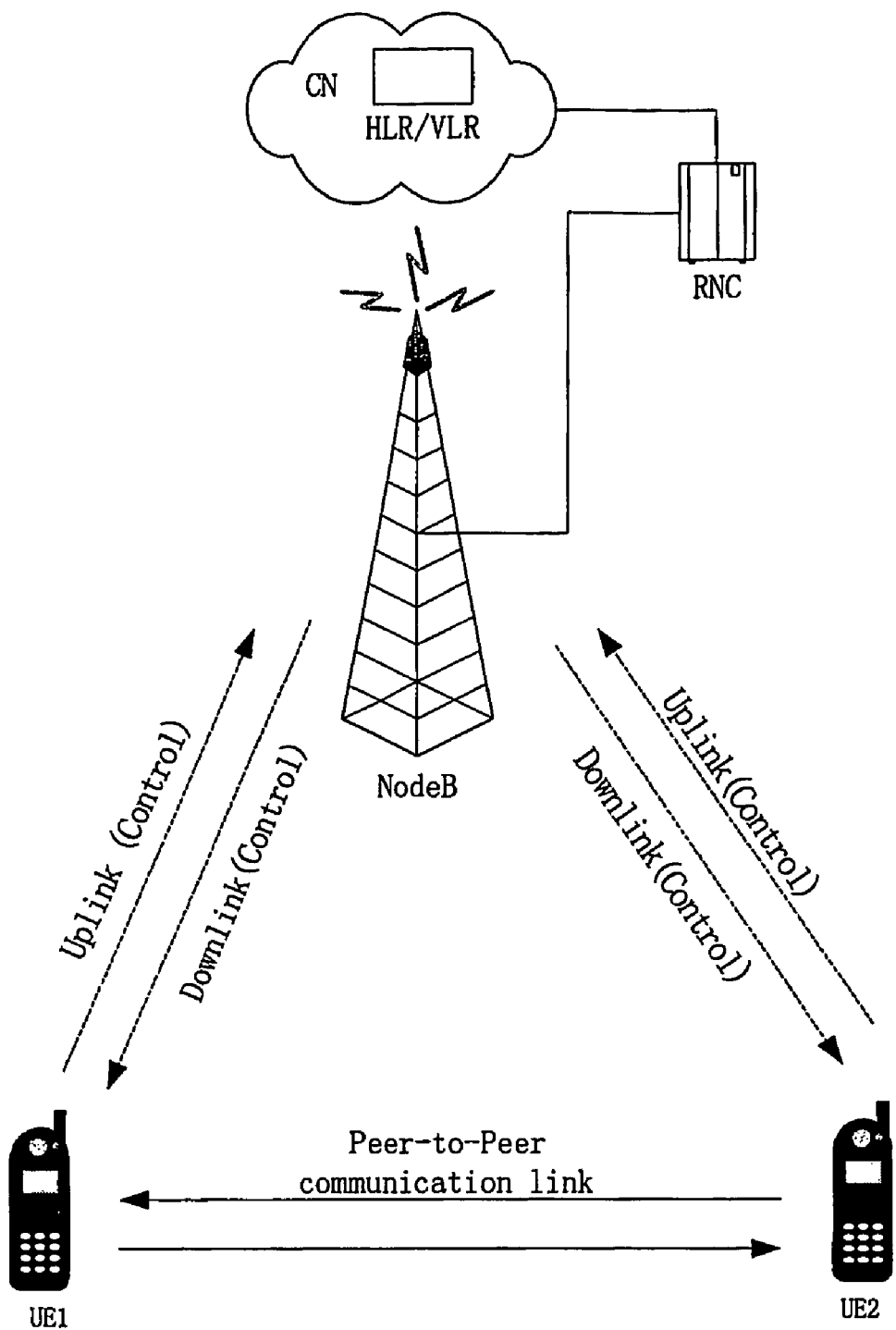
FIG. 1 shows an overview of P2P communication in a wireless communication network, according to one embodiment of the invention.

FIG. 1 shows an overview of P2P communication in a wireless communication network (e.g., a Universal Terrestrial Radio Access Network (UTRAN) and a 3GPP core network), according to one embodiment of the invention. The UTRAN comprises a radio network controller (RNC) 10 responsible for radio resource allocation and management and a Node B 16, which is a base station transceiver. The UTRAN is connected to a 3GPP core network (CN) 20, which is responsible for high layer signaling and data interaction. Home Location Register (HLR) and Vistor Location Register (VLR) 26 typically located in CN 20 are responsible for recording information about mobile users and related services.

In the embodiment shown FIG. 1, non-dedicated control channels between Node B 16 and mobile terminals (e.g., UE1 and UE2) still exist, while the traffic channels exist only between the UEs. Thus, the wireless communication network can control the P2P communications, e.g., for billing purposes. A more detailed description of this type of P2P communication is disclosed, for example, in a co-pending patent application entitled "Method and System for Establishing Peer-to-Peer Communications in Wireless Communication Networks," filed by Koninklijke Philips Electronics N.V., on Mar. 7, 2003, application Ser. No. 03/119,892, the disclosures of which are hereby incorporated by reference.

In FIG. 1, after receiving a request from a mobile terminal (UE1 or UE2) for originating a call to another mobile terminal, the UTRAN will check whether the two UEs have subscribed the P2P communication services. If both UEs have subscribed the P2P communication services, the UTRAN will help them, if feasible, to establish the P2P communication link, and provide the UEs with the discount information about the P2P communication services. The users have a choice of whether to take the advantage of the P2P communication services. If both the users decide to use the P2P communication services, they will pay only a fraction of the normal charges as an incentive. A detailed process for managing the P2P communication by the UTRAN is described below in conjunction with FIG. 2.

Figure 2:
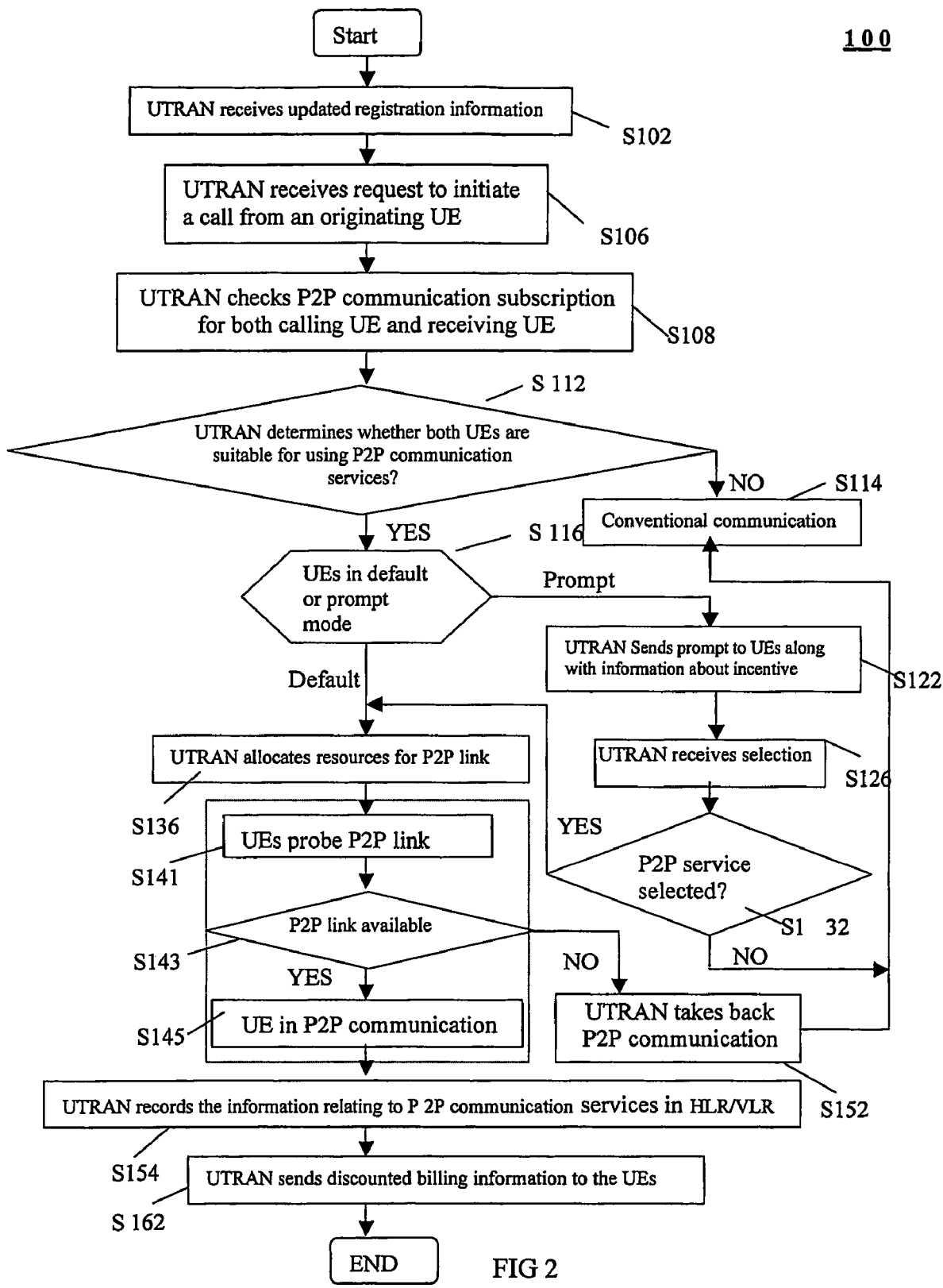
FIG. 2 illustrates a process performed by a wireless communication system (e.g., UTRAN) for managing P2P communication, according to one embodiment of the invention.

FIG. 2 illustrates a process 100 performed by a UTRAN for managing P2P communication, according to one embodiment of the invention. The various steps of process 100 are preferably implemented with software modules.

After a user has switched on a UE, the UE searches in a cell for signals from the UTRAN, via a Broadcasting Control Channel (BCCH). The UTRAN will receive updated registration information from the UE (step S102). If the user has already subscribed the P2P communication services, the user can set (or preset) an operating mode for the P2P communication services as either a default mode or a prompt mode. In the default mode, the P2P communication services are automatically selected as a first choice for communication when the UE originates or receives a call. In the prompt mode, however, the UE will receive a prompt from the UTRAN for selecting the P2P communication services whenever the UE originates or receives a call. Each of the two modes can be set for a specific time duration.

When the UE originates a call, it first sends a request to the UTRAN to initiate the call. The request may include a P2P connect request. After receiving the request to originate the call (step S106), the UTRAN may also automatically attempt to set up a P2P communication link between the originating and receiving UEs, regardless of whether there is a P2P connect request from the UE. The UTRAN will first check whether both UEs have subscribed the P2P communication services (step S108). Then, the UTRAN determines whether both UEs are suitable for using the P2P communication services (step S112). If any one of the UEs is not suitable because of, for example, the UEs are not within a P2P communication supported radio range, the UTRAN will provide the conventional communication services to the UEs (step 114).

On the other hand, if both UEs are suitable for using the P2P communication services, the UTRAN will determine whether the UEs have selected a default or prompt mode for the P2P communication services (step S116). If the prompt mode is selected for a UE, the UTRAN sends a prompt to the UE, along with information about the incentive to encourage the user to select the P2P communication services (step S122). The incentive may be in the form of a discount, a rebate or promotional coupons. The discount may be calculated based on the statistical benefits resulting from the system capacity increase and the overall interference decrease in one cell. The discount rate may also vary in accordance with the actual traffic load conditions or the interference in one cell during a predetermined time duration. For example, if the traffic load is very heavy, the discount rate for the P2P communication services may be higher. Furthermore, users engaging in data services through a P2P link may be rewarded with special discounts.

After the UTRAN receives a selection from the UE (step S126), it determines whether the UE has selected the P2P communication services (step S132). If at least one of the UEs fails to select the P2P communication services because of the QoS (Quality of Service) concerns in the case of an important call for example, the UTRAN will provide the UEs with the conventional communication services (step S114). On the other hand, if both UEs have selected the P2P communication services or both UEs have selected the default mode for using the P2P communication services, the UTRAN will allocate resources for establishing the P2P link between the two UEs (step S136). The UEs then performs the three steps as outlined in FIG. 2. Specifically, the UEs will probe the P2P link (step S141) to determine whether the P2P link is available (step S141). If the P2P link is not available, the UTRAN will take back the P2P communication resources (step S152) and then provide the conventional communication services to the UEs (step S114). If the P2P link is available, however, the UEs will start the P2P communication (step S154).

After the P2P communication is completed and the P2P communication resources are released, the UTRAN records the information relating to the P2P communication services in a Home Location Register (HLR) or a Visitor Location Register (VLR) (step S154), and sends the discounted billing information to the UEs to allow the users to immediately view the related charges (step S162).

In the above, the invention has been illustrated in conjunction with a UTRAN system. However, it is not limited to this system. In fact, any wireless communication system may be used in conjunction with the present invention.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A method performed by a wireless communication system for managing peer-to-peer (P2P) communications, the method comprising the steps of:
   (a) receiving a request from a mobile terminal for initiating a call to another mobile terminal;
   (b) determining whether P2P communication can be established between the two mobile terminals;
   (c) determining an operating mode of the two mobile terminals for P2P communication;
   (d) if one of the mobile terminals is in a prompt mode, sending a prompt to the mobile terminal in the prompt mode, along with information about financial incentives for using P2P communication services if the P2P communication can be established; and
   (e) if the P2P communication can be established and if both mobile terminals are in a default mode for P2P communication, establishing P2P communication between the two mobile terminals.

2. The method of claim 1, wherein step (b) includes the steps of:
   (i) determining whether both mobile terminals have subscribed P2P communication services; and
   (ii) if both mobile terminals have subscribed the P2P communication services, determining whether both mobile terminals are suitable for using the P2P communication services.

3. The method of claim 1, wherein the financial incentives are at least one of a discount, a rebate and promotional coupons.

4. The method of claim 3, wherein step (e) includes the step of: if the mobile terminal in the prompt mode selects the P2P communication services, allocating resources for setting up a P2P link between the two mobile terminals.

5. The method of claim 1, further comprising the step of: if both mobile terminals are in the prompt mode, sending a prompt to the mobile terminals, along with information about financial incentives for using P2P communication services.

6. The method of claim 5, wherein step (e) includes the step of: if both of the mobile terminals in the prompt mode select the P2P communication services, allocating resources for setting up a P2P link between the two mobile terminals.

7. The method of claim 1, further comprising the step of: after the P2P communication between the two mobile terminals is completed, recording information relating to P2P communication services in at least one of a home location register and a visitor location register.

8. The method of claim 7, further comprising the step of: after the P2P communication between the two mobile terminals is completed, sending discounted billing information to the mobile terminals.

9. The method of claim 4, further comprising the steps of, if a P2P link is not available between the two mobile terminals: (i) taking back resources allocated to the P2P link; and (ii) providing conventional communication services to the mobile terminals.

10. The method of claim 3, further comprising the step of calculating the financial incentives based on statistical benefits resulting from at least one of an increase in system capacity and an decrease in overall interference in one cell.

11. The method of claim 3, further comprising the step of calculating the financial incentives in accordance with actual traffic load conditions and interference for a predetermined time duration.

12. A wireless communication system capable of managing peer-to-peer (P2P) communications, comprising: means for receiving a request from a mobile terminal for initiating a call to another mobile terminal; means for determining whether P2P communication can be established between the two mobile terminals; means for determining an operating mode of the two mobile terminals for P2P communication; and means for establishing P2P communication between the two mobile terminals, the establishing means establishing the P2P communication if the P2P communication can be established and if both mobile terminals are in a default mode for P2P communication, wherein if the P2P communication can be established then information about financial incentives for using P2P communication services is sent to at least one of the mobile terminals.

13. The system of claim 12, wherein the first determining means includes: means for determining whether both mobile terminals have subscribed P2P communication services; and means for determining whether both mobile terminals are suitable for using the P2P communication services.

14. The system of claim 12, wherein the financial incentives are at least one of a discount, a rebate and promotional coupons.

15. The system of claim 14, wherein the establishing means includes means for allocating resources for setting up a P2P link between the two mobile terminals, the allocating means allocating the resources if all of the mobile terminals that are in the prompt mode select the P2P communication services.

16. The system of claim 12, further comprising means for recording information relating to P2P communication services in at least one of a home location register and a visitor location register, the recording means recording the information after the P2P communication between the two mobile terminals is completed.

17. The system of claim 16, further comprising means for sending discounted billing information to the mobile terminals, the sending means sending the discounted billing information after the P2P communication between the two mobile terminals is completed.

18. The system of claim 15, further comprising: means for taking back resources allocated to the P2P link; and means for providing conventional communication services to the mobile terminals; wherein the taking back means takes back the resources if the P2P link is not available between the two mobile terminals; wherein the providing means provides the conventional communication services if the P2P link is not available between the two mobile terminals.

19. The system of claim 14, further comprising means for calculating the financial incentives based on statistical benefits resulting from at least one of an increase in system capacity and an decrease in overall interference in one cell.

20. The system of claim 14, further comprising means for calculating the financial incentives in accordance with actual traffic load conditions and interference for a predetermined time duration.

* * * * *